United States Patent
Muratsu

(10) Patent No.: US 7,200,362 B2
(45) Date of Patent: Apr. 3, 2007

(54) METHOD, SYSTEM, AND PROGRAM FOR CONNECTING NETWORK SERVICE, STORAGE MEDIUM STORING SAME PROGRAM, ACCESS POINT STRUCTURE AND WIRELESS USER TERMINAL

(75) Inventor: Fumitake Muratsu, Tokyo (JP)

(73) Assignee: NEC Corporation, Tokyo (JP)

( * ) Notice: Subject to any disclaimer, the term of this patent is extended or adjusted under 35 U.S.C. 154(b) by 172 days.

(21) Appl. No.: 10/860,284

(22) Filed: Jun. 4, 2004

(65) Prior Publication Data

US 2004/0248557 A1    Dec. 9, 2004

(30) Foreign Application Priority Data

Jun. 4, 2003    (JP) ............................ 2003-159197

(51) Int. Cl.
*H04B 7/00* (2006.01)
(52) U.S. Cl. .................. 455/41.2; 455/418; 455/432.1; 455/435.1; 455/422.1; 455/439; 455/414.1; 455/450; 370/338; 370/352; 370/389; 709/219; 709/223
(58) Field of Classification Search .............. 455/41.2, 455/418, 432.1, 432.2, 432.3, 435.1, 435.2, 455/422.1, 439, 414.1, 414.2, 450–452.1; 370/338, 352, 389; 709/219, 223
See application file for complete search history.

(56) References Cited

U.S. PATENT DOCUMENTS

| | | | |
|---|---|---|---|
| 6,148,198 A * | 11/2000 | Anderson et al. ........ 455/432.1 |
| 6,269,395 B1 * | 7/2001 | Blatherwick et al. ....... 709/219 |
| 6,741,853 B1 * | 5/2004 | Jiang et al. ................. 455/418 |
| 6,879,584 B2 * | 4/2005 | Thro et al. ................... 370/352 |
| 2002/0022483 A1 * | 2/2002 | Thompson et al. ......... 455/439 |
| 2002/0087674 A1 * | 7/2002 | Guilford et al. ............ 709/223 |
| 2002/0101858 A1 * | 8/2002 | Stuart et al. ................ 370/352 |
| 2004/0181692 A1 * | 9/2004 | Wild et al. .................. 713/201 |

OTHER PUBLICATIONS

"Hot Spot", Internet—www.hotspot.ne.jp, searched on Apr. 25, 2003.

* cited by examiner

*Primary Examiner*—Steve M. D'Agosta
(74) *Attorney, Agent, or Firm*—Young & Thompson

(57) ABSTRACT

A network service connecting system is provided which is capable of eliminating waste in establishing association between a wireless user terminal and an access point. A service ID (Identification) producing section produces a service ID containing a service application ID and a service vendor ID. A Probe request transmitting section transmits the service ID to the access point. A data storing section holds data on associated relations among service, a service vendor, and a V-LAN (Virtual Local Area Network) switch. When a Probe request receiving section receives a service ID, an SSID (Service Set Identification) judging section, by referring to the above data on the associated relation, judges whether an ID of the service vendor is contained in the service ID. If it is contained, a Probe response transmitting section transmits an SSID to the wireless user terminal.

23 Claims, 4 Drawing Sheets

METHOD, SYSTEM, AND PROGRAM FOR CONNECTING NETWORK SERVICE, STORAGE MEDIUM STORING SAME PROGRAM, ACCESS POINT STRUCTURE AND WIRELESS USER TERMINAL

BACKGROUND OF THE INVENTION

1. Field of the Invention

The present invention relates to service of connecting a wireless user terminal to a service vendor on the Internet by using a wireless LAN (Local Area Network).

The present application claims priority of Japanese Patent Application No. 2003-159197 filed on Jun. 4, 2003, which is hereby incorporated by reference.

2. Description of the Related Art

In recent years, service of connecting a wireless user terminal to a service vendor on the Internet by using a wireless LAN is increasing (such service as "Hot Spot" is described in non-references that are found on the Internet.

A method (hereinafter, referred to as "network service connecting method") to achieve such the service includes a first step in which a wireless user terminal searches for an access point and a second step in which the wireless user terminal establishes association through the searched access point with a service vendor.

The first step is performed through a wireless LAN (IEEE802.11). The wireless user terminal, in order to establish association with an access point, acquires, by some methods, an SSID (Service Set Identification) set at the access point. Two methods for a wireless user terminal to establish association with an access point are available.

One method is that a wireless user terminal acquires an SSID which is issued periodically by an access point in its communicable area and, by using the acquired SSID, the wireless user terminal establishes association with the access point, which is referred to as a "Passive Scan" method.

Another method is that a wireless user terminal determines, in advance, an SSID of an access point that the wireless user terminal wants to establish association with and makes inquiries of whether the access point having this SSID exists in an area with which the wireless user terminal is communicable, which is referred to as an "Active Scan" method.

In a second step, an authentication server installed in a service vendor performs authentication of a wireless user terminal. The authentication server judges whether permission is given for connection according to a user ID (Identification) or a password that a wireless user terminal holds.

However, keys (SSID, user ID, and password) to be used in these two steps are different from one another. Therefore, there is a possibility that, even if a wireless user terminal can establish association with an access point in step 1, the user terminal fails in connecting to a service vendor. For example, even if a wireless user terminal succeeds in searching for an SSID of an access point using the Passive Scan method and, by using the SSID as a key, can establish association with the access point, when the wireless user terminal does not have a user ID and a password that the access point provides connection to a service vendor, the wireless user terminal cannot be connected to the service vendor in the end. In such the case, the wireless user terminal has to establish association with another access point that provides connection to the service vendor.

In order to eliminate such useless association processing and to save a wireless resource, a method is available in which keys being used in steps 1 and 2 are associated with one another and the resulting association data is stored; however, if such the method is employed, costs for management of a wireless user terminal increase.

SUMMARY OF THE INVENTION

In view of the above, it is an object of the present invention to provide a network service connecting method which is capable of eliminating useless association processing between a wireless user terminal and an access point without imposing a load on the wireless user terminal.

According to a first aspect of the present invention, there is provided a network service connecting method by which an access point enables a wireless user terminal to be connected to a service vendor on a network via a wireless LAN, the method including:

a first step in which the wireless user terminal produces a service ID containing a service application ID being an ID of service required for execution of a specified application selected by the wireless user terminal and a service vendor ID being an ID of the service vendor holding authentication information which is required for the wireless user terminal to be connected to the service vendor;

a second step in which the wireless user terminal, by using the service ID, searches for an access point existing in an area where the wireless user terminal is communicable;

a third step in which an access point having received the service ID, by referring to a table storing data on associated relations among a service application ID, a service vendor ID of a service vendor providing service identified by the service application ID, and a VLAN (Virtual Local Area Network)-ID being an ID of a V-LAN switch serving as a mediator for connection between the service vendor and the access point, judges whether or not a service vendor ID corresponding to a service application ID included in the service ID is contained in the service ID;

a fourth step in which the access point, only when judging the service ID corresponding to the service application ID to be contained in the service ID in the third step, selects a VLAN-ID corresponding to the service ID; and a fifth step in which the access point, only when judging the service ID corresponding to the service application ID to be contained in the service ID in the third step, transmits an SSID (Service Set Identification) set at the access point to the wireless user terminal.

In the foregoing, a preferable mode is one wherein the service ID contains two or more service vendor IDs.

Also, a preferable mode is one wherein the first step further comprises a step in which the wireless user terminal adds identification information to be used for distinguishing the service ID from the SSID to the service ID.

Also, a preferable mode is one wherein the first step further comprises a step in which the wireless user terminal adds detecting option information to indicate whether or not the service application ID contained in the service ID is indispensable to the application to the service ID for every the service application ID.

Also, a preferable mode is one wherein, in the third step, the access point judges, by referring to the table, whether or not a service vendor ID, to be contained in the service ID, corresponding to the service application ID to which a detecting option indicating that the service application ID is indispensable to the application has been added is contained in the service ID.

Also, a preferable mode is one wherein, in the fourth step, the access point, when two or more VLAN-IDs are allowed to be selected, preferentially selects the VLAN-ID corresponding to more service application IDs.

Also, a preferable mode is one wherein, in the fourth step, the access point, when two or more VLAN-IDs are allowed to be selected, selects the VLAN-ID according to priority specified by the access point.

Also, a preferable mode is one that wherein includes a step in which, after the fifth step, the access point, when the wireless user terminal makes a request asking establishment of association with the access point by using the SSID, makes a request of the wireless user terminal for authentication information to connect the wireless user terminal to the service vendor, and then asks an authentication server, which shares authentication information for connecting to the service vendor, to perform authentication for the wireless user terminal and, only when the authentication is successfully performed, accepts the request for establishment of association from the wireless user terminal to establish the association.

According to a second aspect of the present invention, there is provided a computer program making a wireless user terminal enabled by an access point to be connected to a service vendor on a network via a wireless LAN perform a first step of producing a service ID containing a service application ID being an ID of service required for execution of a specified application selected by the wireless user terminal and a service vendor ID being an ID of the service vendor holding authentication information which is required for the wireless user terminal to be connected to the service vendor and perform a second step of searching, by using the service ID, for an access point existing in an area where the wireless user terminal is communicable.

In the foregoing, a preferable mode is one wherein the service ID contains two or more service vendor IDs.

Also, a preferable mode is one that wherein includes a step in which the wireless user terminal adds identification information to be used for distinguishing the service ID from an SSID set at the access point to the service ID.

Also, a preferable mode is one wherein the first step further comprises a step in which the wireless user terminal adds detecting option information indicating whether or not the service application ID contained in the service ID is indispensable to the application to the service ID for every the service application ID.

According to a third aspect of the present invention, there is provided a computer program making an access point which enables a wireless user terminal to be connected to a service vendor on a network via a wireless LAN perform a first step of judging, when receiving a service ID transmitted from the wireless user terminal, by referring to a table which stores data on associated relations among a service application ID, a service vendor ID of a service vendor providing service identified by the service application ID, and a VLAN-ID being an ID of a V-LAN switch serving as a mediator for connection between the service vendor and the access point, whether or not the service vendor ID associated with the service application ID contained in the service ID is contained in the service ID, performs a second step of selecting, only when judging the service ID corresponding to the service application ID to be contained in the service ID in the first step, a VLAN-ID corresponding to the service ID, and perform a third step of transmitting, only when judging the service ID corresponding to the service application ID to be contained in the service ID in the first step, an SSID (Service Set Identification) set at the access point to the wireless user terminal.

In the foregoing, a preferable mode is one wherein, in the first step, by referring to the table, judgement is made as to whether or not the service vendor ID, to be contained in the service ID, corresponding to the service application ID to which a detecting option indicating that the service application ID is indispensable to the application has been added is contained in the service ID.

Also, a preferable mode is one wherein, in the second step, when two or more VLAN-IDs are allowed to be selected, the VLAN-ID corresponding to more service application IDs is selected preferentially.

Also, a preferable mode is one wherein, in the second step, when two or more VLAN-IDs are allowed to be selected, the VLAN-ID is selected according to priority specified by the access point.

Furthermore, a preferable mode is one that wherein includes a step of making the access point perform a step in which, after the third step, when the wireless user terminal makes a request asking establishment of association with the access point by using the SSID, a request is made of the wireless user terminal for authentication information to connect the wireless user terminal to the service vendor, and then a request is made asking an authentication server, which shares authentication information for connecting to the service vendor, to perform authentication for the wireless user terminal and, only when the authentication is successfully performed, the request for establishment of association from the wireless user terminal is accepted to establish the association.

According to a fourth aspect of the present invention, there is provided a storage medium being able to be read by a computer which stores programs described above.

According to a fifth aspect of the present invention, there is provided a storage medium being able to be read by a computer which stores programs described above.

According to a sixth aspect of the present invention, there is provided a wireless user terminal enabled by an access point to be connected to a service vendor on a network via a wireless LAN including:

a first unit to produce a service ID containing a service application ID being an ID of service required for execution of a specified application selected by the wireless user terminal and a service vendor ID being an ID of the service vendor holding authentication information which is required for the wireless user terminal to be connected to the service vendor; and a second unit to search, by using the service ID, for an access point existing in an area where the wireless user terminal is communicable.

In the foregoing, a preferable mode is one wherein the service ID contains two or more service vendor IDs.

Also, a preferable mode is one that wherein includes a unit to add identification information to identify an SSID (Service Set Identification) set at the access point to the service ID.

Furthermore, a preferable mode is one wherein the first unit further comprises a unit to add detecting option information indicating whether or not the service application ID contained in the service ID is indispensable to the application to the service ID for every service application ID.

According to a seventh aspect of the present invention, there is provided an access point structure which enables a wireless user terminal to be connected to a service vendor on a network via a wireless LAN including:

a first unit to store a table which saves data on associated relations among a service application ID, a service vendor ID of a service vendor providing service identified by the service application ID, and a VLAN-ID being an ID of a V-LAN switch serving as a mediator for connection between the service vendor and the access point;

a second unit to judge, when receiving a service ID transmitted by the wireless user terminal, by referring to the table, whether or not a service vendor ID corresponding to the service application ID contained in the service ID is contained in the service ID;

a third unit to select, when the second unit judges the service vendor ID corresponding to the service application ID to be contained in the service ID, a VLAN-ID corresponding to the service vendor ID; and a fourth unit to transmit, when the second unit judges the service vendor ID corresponding to the service application ID to be contained in the service ID, an SSID (Service Set Identification) of the access point to the wireless user terminal.

In the foregoing, a preferable mode is one wherein the second unit, by referring to the table, judges whether or not the service vendor ID, to be contained in the service ID, corresponding to the service application ID to which a detecting option indicating that the service application ID is indispensable to the application has been added is contained in the service ID.

Also, a preferable mode is one wherein the third unit, when two or more VLAN-IDs are allowed to be selected, preferentially selects the VLAN-ID corresponding to more service application IDs.

Also, a preferable mode is one wherein the third unit, when two or more VLAN-IDs are allowed to be selected, selects the VLAN-ID according to priority specified by the access point.

Furthermore, a preferable mode is one that wherein includes a unit to make, after the SSID has been transmitted by the fourth unit, when a request is made asking establishment of association by using the SSID, a request of the wireless user terminal for authentication information to connect the wireless user terminal to the service vendor, to ask an authentication server, which shares authentication information for connecting to the service vendor, to perform authentication for the wireless user terminal and, only when the authentication is successfully performed, to accept the request for establishment of association from the wireless user terminal to establish the association.

According to an eighth aspect of the present invention, there is provided a system in which the access point described above enables the wireless user terminal described above to be connected to a service vendor on a network via a wireless LAN.

With the above configuration, authentication of a service vendor that a wireless user terminal wants to use can be ensured at a stage when the wireless user terminal establishes association with an access point. As a result, an event can be avoided where, though the wireless user terminal establishes association with an access point, there exists no service vendor that can authenticates the wireless user terminal. This enables useless association processing to be eliminated and radio resource to be saved.

With another configuration, high-speed connection to an access point is made possible. That is, in recent years, a "stealth mode" setting is recommended in which, in order to improve security, an SSID is not transmitted from an access point to a wireless user terminal. In this case, the wireless user terminal has to try a plurality of SSIDs held in itself one by one. According to the present invention, establishment of association is made possible by using only one service ID, which enables rapid connection to the access point.

With still another configuration, to hold data on associated relations between service and an SSID by the wireless user terminal is not required. As a result, a memory resource required by the wireless user terminal can be reduced.

With still another configuration, transmission of a Probe response to a wireless user terminal to which service cannot be given is not required. As a result, a radio resource consumed by communications can be saved.

With still another configuration, since authentication processing to be performed by an authentication server in a service vendor is executed at a stage of establishing association, when the wireless user terminal has a user ID and a password not leading to successful authentication processing by the authentication server, wasteful consumption of a radio resource by communications between the wireless user terminal and the authentication server can be avoided.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
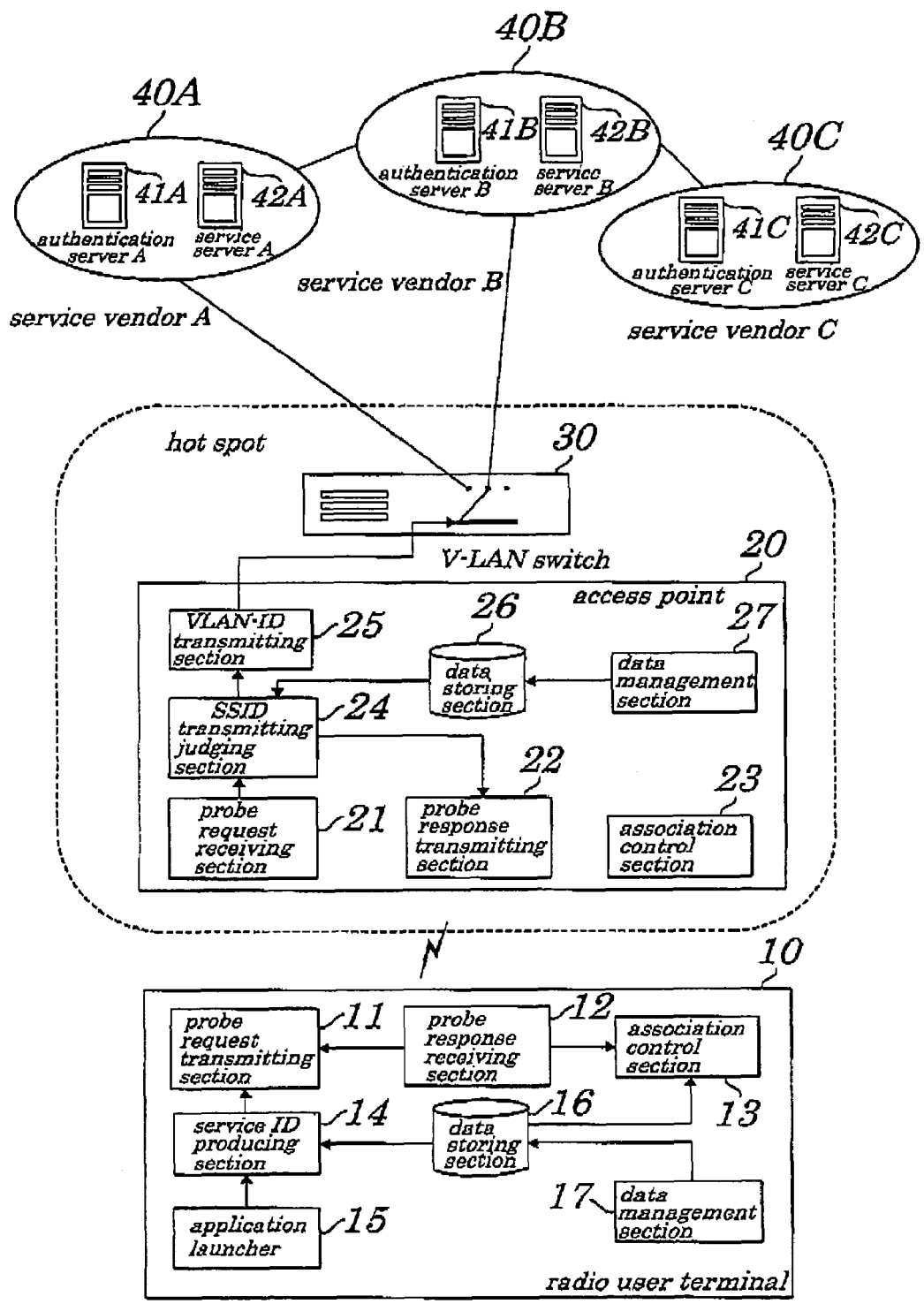
FIG. 1 is a schematic block diagram showing configurations of a network service connecting system according to a first embodiment of the present invention.

As shown in FIG. 1, a network service connecting system according to a first embodiment of the present invention includes a wireless user terminal (hereinafter referred to as radio user terminal) 10 which is provided with a wireless LAN interface and is to be connected to a service vendor, an access point 20 which establishes association with the radio user terminal 10 and provides connection to a service vendor 40 on a wireless LAN level, that is, by using a wireless LAN, a V-LAN switch 30 which connects the radio user terminal 10 being connected to the access point 20 to a specified service vendor 40 (40A, 40B, or 40C), and the service vendor 40 (40A, 40B, 40C) such as an internet service provider or a like which gives service on a network to the radio user terminal 10 that a connection to the service vendor 40 (40A, 40B, 40C) has been established.

The radio user terminal 10 includes a Probe request transmitting section 11, a Probe response receiving section 12, an association control section 13, a service ID producing section 14, an application launcher 15, a data storing section 16, and a data management section 17.

The Probe request transmitting section 11, by using a service ID input from the service ID producing section 14, transmits a Probe request to the access point 20. The service ID is described later.

The Probe response receiving section 12 receives a Probe response from the access point 20 to acquire an SSID of the access point 20.

The association control section 13, based on the SSID designated by the Probe response receiving section 12, establishes association with the access point 20. Moreover, if necessary, by using a WEP (Wired Equipment Privacy) key, performs association processes including authentication.

The service ID producing section 14, by using an ID of an application to be executed by the radio user terminal 10 and an ID of a service vendor that a user wants to use, produces a service ID.

The application launcher 15 notifies the service ID producing section 14 of the ID of the application to be executed by the radio-user terminal 10.

The data storing section 16 is constructed of a general data holding mechanism such as a flash memory, hard disk, or a like and stores information used to associate the application with a service ID, information about the service vendor 40 (40A, 40B, 40C) that can be used by the radio user terminal 10, and a user ID and password associated with the service vendor 40 (40A, 40B, 40C).

Table 1 shows data on associated relations of an application managed by the application launcher 15 with service, to be provided by the service vendor 40, expressed in a form of an ID (hereinafter referred to as "service application ID"), which is required by the above application. Each service application ID is associated with detecting option, which is used as information as to whether service associated with the service application ID is indispensable to the application. In the example shown in Table 1, a case where a value is "MUST" shows that the service corresponding to the service application ID is indispensable to the application. A case where a value is "SHOULD" shows that the service corresponding to the service application ID is not indispensable to the application

TABLE 1

| Application ID | Service application ID | Detecting option |
|---|---|---|
| Messenger | TEL | MUST |
|  | IM | SHOULD |
| Movie Player | MOV | MUST |
| Mailer | ML | MUST |
| Phone Application | TEL | MUST |

In Table 2, an ID of the service vendor 40 to which a user using a radio user terminal 10 has become a subscriber and information about authentication (user ID and password) required to be connected to the service vendor 40 are shown.

TABLE 2

| Service vendor ID | User ID | Password |
|---|---|---|
| Vend-A | tanaka | abcd |

The data management section 17 updates information being held by the data storing section 16 when an application is newly added to the radio user terminal 10 and/or when a change occurs in authentication information (user ID and password) to be used for connection to the service vendor 40. Moreover, the data management section 17 may have a communication interface to carry out an exchange of updating data with the outside. As the communication interface, a wired interface such as a USB (Universal Serial Bus), LAN, or a like or a wireless interface such as a wireless LAN or Bluetooth, or a wireless interface using an infrared ray or a like may be employed.

The access point 20 includes a Probe request receiving section 21, a Probe response transmitting section 22, an association control section 23, an SSID transmission judging section 24, a VLAN-ID transmitting section 25, a data storing section 26, and a data management section 27.

The Probe request receiving section 21 receives a Probe request from the radio user terminal 10 and acquires a service ID specified by the radio user terminal 10.

The Probe response transmitting section 22 transmits a Probe response to the radio user terminal 10. The Probe response contains an SSID set at the access point 20.

The association control section 23 accepts an association request from the radio user terminal 10 and puts the radio user terminal 10 into a state where the radio user terminal 10 is communicable with the access point 20.

The SSID transmission judging section 24 judges, using a service ID obtained when having received the Probe request, whether or not an SSID required to put the radio user terminal 10 into a state where it is connected to the access point 20 is to be transmitted to the radio user terminal 10. The judgement is made depending on whether or not the access point 20 supports connection to the service vendor 40 corresponding to the obtained service ID.

The VLAN-ID transmitting section 25 transmits a VLAN-ID input from the SSID transmission judging section 24 and a MAC address of the radio user terminal 10 that has transmitted the Probe request to the access point 20, to a VLAN-switch 30.

The data storing section 26 is constructed of a general data holding mechanism such as a flash memory, hard disk, or a like and stores an ID of the service vendor 40, service provided by the service vendor 40, information used to associate the VLAN-ID to be connected to the service vendor 40, and information about an SSID assigned to the access point 20.

In Table 3, an ID of service application, an ID of a service vendor that can provide service identified by the service application ID, a VLAN-ID indicating a network that can be used when the service vendor 40 gives service to the radio user terminal 10. In Table 3, when two or more VLAN-IDs are recorded for one service vendor ID, it shows that roaming service is provided among service vendors.

TABLE 3

| Service application ID | Service vendor ID | VLAN ID |
|---|---|---|
| TEL | Vend-A | 0001 |
|  |  | 0003 |
|  | Vend-B | 0002 |
|  |  | 0003 |
| MOV | Vend-B | 0002 |
|  |  | 0001 |
| IM | Vend-A | 0003 |
| ABT | Vend-B | 0002 |

The data management section 27 updates contents of information being stored in the data storing section 26 when service provided by the service vendor 40 is added newly. Moreover, the data management section 27 may have a communication interface to carry out an exchange of updating data with the outside. As the communication interface, a wired interface such as a USB (Universal Serial Bus), LAN, or a like or a wireless interface such as a wireless LAN or Bluetooth, or a wireless interface using an infrared ray or a like may be employed.

In the embodiment of the present invention, the number of the access points 20 being connected to the V-LAN switch 30 is one, however, the number of the access points 20 being connected to one V-LAN switch 30 may be two or more. The V-LAN switch 30, by using an ID assigned to a network to be switched (hereafter referred to as VLAN-ID) and information (MAC address) used to identify the radio user terminal 10, switches a network.

The service vendor 40 (40A, 40B, 40C) according to the embodiment includes an authentication server 41 (41A, 41B, 41C) to authenticate the radio user terminal 10 and a service server 42 (42A, 42B, 42C) to provide actual service such as a TV (Television) phone, distribution of moving pictures, or a like.

Figure 2:
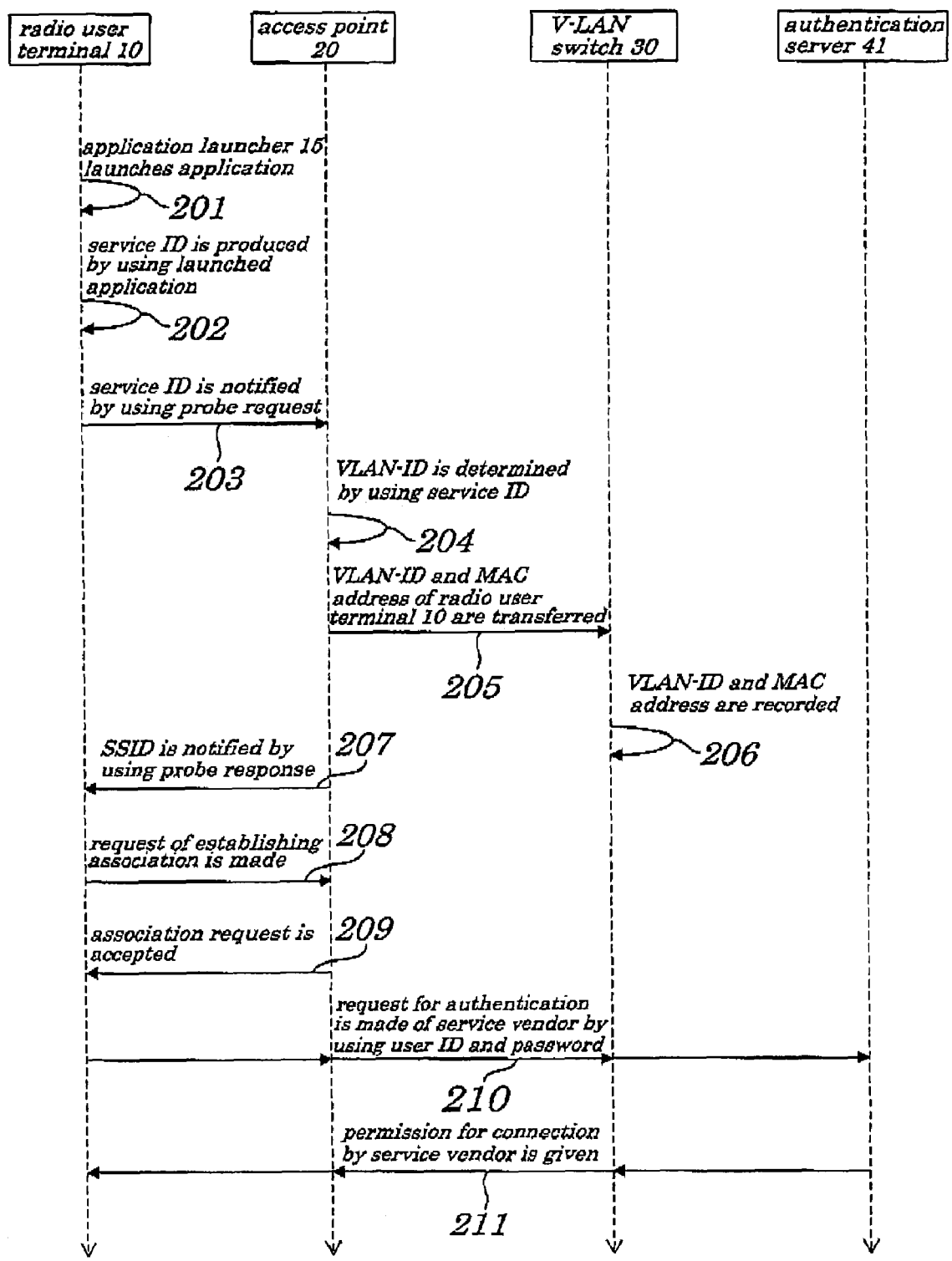
FIG. 2 is a sequence diagram showing operations of the network service connecting system according to the first embodiment of the present invention.

Next, operations of a network service connecting system of the first embodiment of the present invention are described in detail by referring to FIG. 2.

In step 201, the radio user terminal 10 launches an application to use service. At this point, the application launcher 15 determines an ID of the launched application and transfers the data to the service ID producing section 14.

In step 202, the service ID producing section 14 having received the application ID acquires a service application ID corresponding to an application ID and detecting option information from the list shown in Table 1 being stored in the data storing section 16. Moreover, the service ID producing section 14 acquires a service vender ID from the list in Table 2. In the embodiment of the present invention, the number of the service vendor IDs is one, however, if two or more service vendor IDs are recorded, the user may select any service vendor ID explicitly or the radio user terminal 10 may select automatically. The service ID producing section 14 produces a service ID by using a service application ID acquired from Tables 1 and 2, service vendor ID, detecting option information, and information used to be used for distinguishing a service ID from an SSID.

Examples of production of a service ID are shown below:

EXAMPLES

Selected application ID: "Movie Player"
Selected service vendor ID: "vend-A"
⇒ SV:MOV@vend-A
Selected application ID: "Messenger"
Selected service vendor ID: "vend-B"
⇒ SV:TEL.im@vend-B In order to distinguish the service ID from the SSID (service set ID), a prefix of "SV:" is used. A service vendor ID is placed in an end of the service application ID using "@" as a delimiter. In the upper example, "Movie Player" is selected as the application ID and the service application ID is "MOV". In the lower example, "Messenger" is selected as the application ID and the service application ID is "TEL" and "IM". If two or more service application IDs exist, the service application IDs are put into a specified order, each of which is delimited with "." If detecting option of the service application ID is "SHOULD", the service application ID is expressed in a small character and, in the lower example, the service application ID becomes "TEL. im".

In step 203, after the production of the service ID by the service ID producing section 14 has been completed, the service ID is transferred to the Probe request transmitting section 11 and the Probe request transmitting section 11 performs the Active Scan processing (that is, transmission of the Probe request in which the Active Scan process is performed by designating not an SSID but a service ID) for connection to the access point 20. The transmitted Probe request is received by the Probe request receiving section 21 in the access point 20.

In step 204, the Probe request receiving section 21 transfers the received service ID to the SSID transmission judging section 24. The SSID transmission judging section 24 extracts the service application ID and the service vendor ID from the received service ID and judges, by using these IDs and referring to the list in Table 3, whether or not the SSID transmission judging section 24 gives a Probe response to the radio user terminal 10. A condition for giving the response is "whether the service vendor ID corresponding to a column of the extracted service application ID is contained in the extracted service vendor ID". If there are two or more service application IDs that corresponds to one application, it is necessary that the service vendor ID associated with all the service application IDs is contained in the extracted service vendor ID. However, if the detecting option is "SHOULD", as an exceptional case, even if association is not established, the Probe response is given (because it is not indispensable).

The SSID transmission judging section 24, if judging that the Probe response is to be given to the radio user terminal 10, makes a request of the Probe response transmitting section 22 to give a response to the radio user terminal 10. At the same time, a VLAN-ID is acquired from the list in Table 3. The selection of the VLAN-ID is made according to following selection rules:

(1) Priority is given to a VLAN-ID that can use more service application IDs.

(2) If there are two or more VLAN-IDs determined by the service application ID and the service vendor ID, selection is made according to priority of the VLAN-ID. Here, the VLAN-ID placed in a highest-order position has highest priority.

Examples of operations by which a VLAN-ID is obtained from the service ID by using the list in Table 3.

If the service ID is <SV: TEL. im@vend-A>, as shown in the list in Table 3, in regard to the VLAN-IDs associated with the essential "TEL" and "vend-A", there are two kinds of "0001" and "0003", however, the VLAN-ID corresponding to the not-essential "IM" and "vend-A" is "0003" only. In this case, according to the rule (1) that priority is given to an ID that can use two or more pieces of service, the VLAN-ID to be selected is "0003".

If the service ID is <SV: TEL@vend-A>, as shown in the list in Table 3, the corresponding VLAN-IDs are both "0001" and "0003". In this case, according to the rule (2) that the VLAN-ID placed in a highest-order position has highest priority, the VLAN-ID to be selected is "0001". In step 205, the SSID transmission judging section 24 transfers the VLAN-ID fed from the data storing section 26 to the VLAN-ID transmitting section 25. The VLAN-ID transmitting section 25 transfers the VLAN-ID to the V-LAN switch 30. At this time, the VLAN-ID transmitting section 25 acquires a MAC address of the radio user terminal 10 from the Probe request receiving section 21 and transfers it to the V-LAN switch 30 in the same manner as above. The MAC address of the radio user terminal 10 is used when the V-LAN switch 30 exerts control on switching to the service vendor 40 for every radio user terminal 10.

In step 206, the V-LAN switch 30 records the VLAN-ID and the MAC address. In step 207, the Probe response transmitting section 22 requested by the SSID transmission judging section 24 to transmit a Probe response acquires an SSID set at the access point 20 by the data storing section 26 and transmits the information in a manner in which it is carried by the Probe response, to the radio user terminal 10.

In step 208, the Probe response is received by the Probe response receiving section 12 in the radio user terminal 10. The Probe response receiving section 12 acquires an SSID of the access point 20 and transfers the acquired SSID to the association control section 13. The association control section 13 establishes association with the access point 20 using the transferred SSID. Moreover, when the Probe response receiving section 12 acquires an SSID of the access point 20, the SSID may be again transmitted to the Probe request transmitting section 11 and an ordinary Active Scan process may be redone. By doing this, as a result of the Active Scan process, an ordinary establishment of the association with a conventional access point not employing the method of the present invention may be performed. This represents that, only by putting one access point(s) 20 according to the embodiment as any one(s) of the two or more access points managed in the Hot Spot, an effect that the present invention aims to achieve can be obtained.

In step 209, the access point 20 accepts the association request and each of the association control section 13 in the radio user terminal 10 and the association control section 23 in the access point 20 performs the association process by using the SSID as a key. This process is a general process designated by IEEE (Institute of Electric and Electronics Engineers) 802.11. At this point, authentication using a WEP key or according to a process designated by IEEE 802.1x may be performed. In this case, the information required for authentication is stored in each of the data storing section 16 in the radio user terminal 10 and the data storing section 26 in the access point 20.

In step 210, the radio user terminal 10, after the establishment of the association has been completed, makes a request of an authentication server 41 in the service vendor 40 being connected on the network that was switched by the V-LAN switch 30, for authentication. In the embodiment, the radio user terminal 10 gives a user ID and a password to the authentication server 41 in the service vendor 40. The information about these is stored in the data storing section 16 in the radio user terminal 10. In step 211, the authentication server 41 gives permission for connection to the service vendor by the radio user terminal 10.

Second Embodiment

In the first embodiment, a VLAN-ID and a MAC address of the radio user terminal 10 are notified to the VLAN switch 30 with timing with which an SSID is transmitted by the access point 20 to the radio user terminal 10. However, another method is possible. That is, an SSID is notified to the authentication server 41 installed on the Hot Spot when authentication by the service vendor 40 is performed after the association process by the radio user terminal 10 and access point 20 has been completed. In this case, part of the configurations is changed as below.

(1) An authentication server such as a RADIUS (Remote Authentication Dial In User Service) server is additionally installed in the Hot Spot in FIG. 1.

(2) When authentication is successfully performed by the above authentication server, a VLAN-ID and a MAC address are notified by the authentication server to the V-LAN switch 30.

In the first embodiment, for example, when a radio user terminal 10 has a user ID and a password used for connection to a service vendor 40, even if they are invalid or useless, the radio user terminal 10 tries to be connected to the service vendor 40. As a result, a radio resource is consumed wastefully, after the completion of the establishment of the association, due to communications between the radio user terminal 10 and the authentication server 41. To eliminate this waste, changes in configurations as above are effective.

Figure 3:
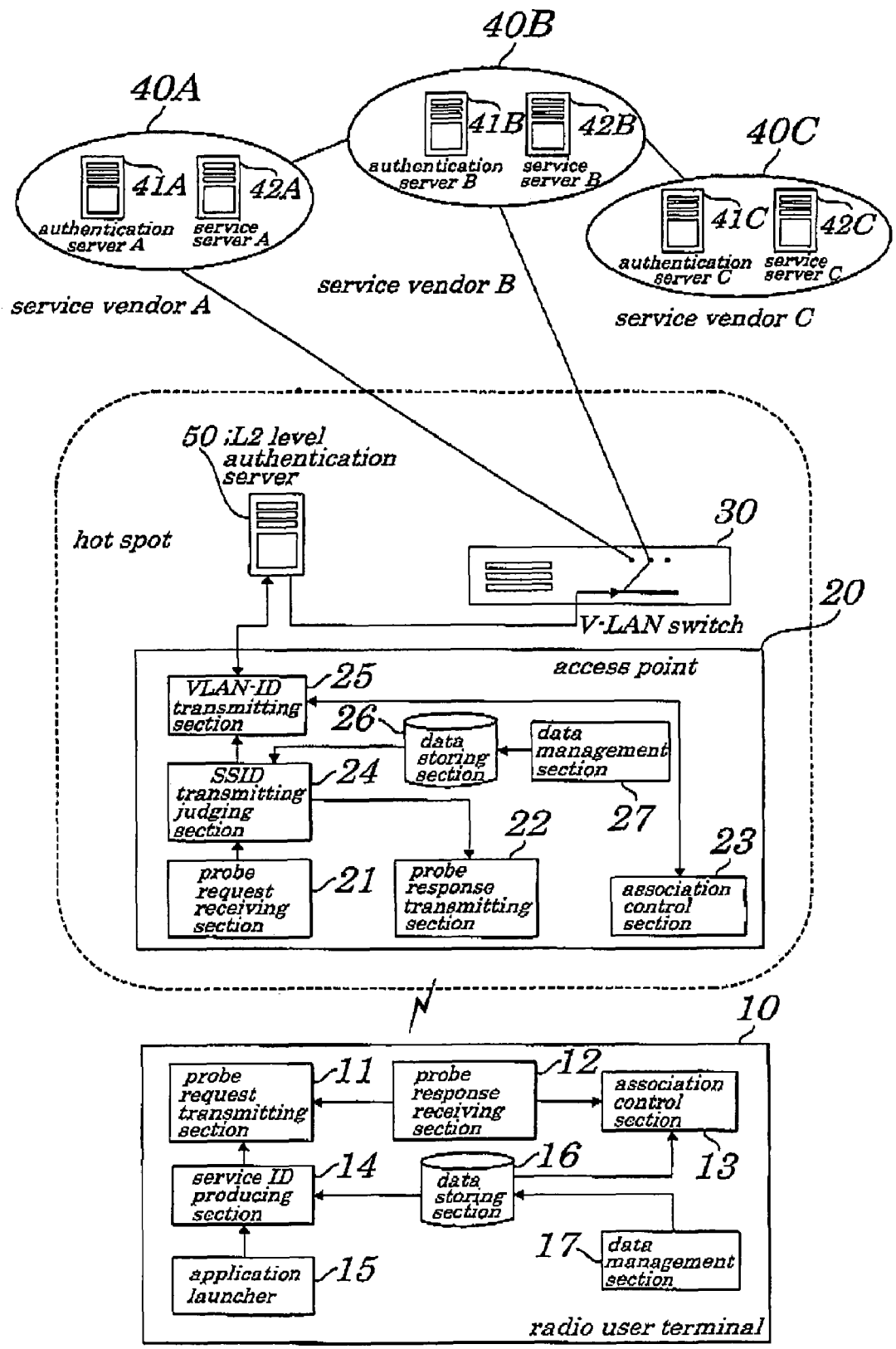
FIG. 3 is a schematic block diagram showing configurations of a network service connecting system according to a second embodiment of the present invention.

In the second embodiment, same reference numbers are assigned to parts having the same function as the first embodiment. Configurations of the network service connecting system of the second embodiment of the present invention are described by referring to FIG. 3. As shown in FIG. 3, the network service connecting system of the second embodiment has, in addition to components of the network service connecting system of the first embodiment, an L2 level authentication server 50 in a Hot Spot. In an access point 20, a VLAN-ID transmitting section 25 is communicated with an association control section 23.

The association control section 23, when a request for association from the radio user terminal 10 is accepted, in addition of operations performed in the first embodiment, makes a request of the L2 level authentication server 50 to perform authentication as to whether or not permission for connection by the radio user terminal 10 is given. Moreover, the association control section 23, when making a request of the L2 level authentication server 50 for authentication of the radio user terminal 10, may exchange data with the L2 level authentication server 50, instead of communication through the VLAN-ID transmitting section 25.

The VLAN-ID transmitting section 25, unlike in the case of the first embodiment, transmits a VLAN-ID input from an SSID transmission judging section 24 and a MAC address of a radio user terminal 10 which has transmitted a Probe request to the access point 20, to the L2 level authentication server 50.

The L2 level authentication server 50 authenticates a radio user terminal 10 that made for a request for association with the access point 20. Also, the L2 level authentication server 50 transmits the MAC address of the radio user terminal 10 to which permission for connection is given and the VLAN-ID to the V-LAN switch 30.

In the second embodiment, it is necessary that the L2 level authentication server 50 and the authentication server 41 in the service vendor 40 share, in some forms, information about authentication of a user that handles the system. Following methods for having them share the above information are available:

(1) The authentication server 41 in the service vendor 40 and the L2 level authentication server 50 are connected to each other via the network and, when the user is authenticated, a random number produced using a user ID and a password is transmitted from the authentication server 41 to the L2 level authentication server 50.

(2) The L2 level authentication server 50 is made to have all information about the user authentication possessed by the authentication server 41 in the service vendor 40 (description of the authentication server 41 in the service vendor 40 is omitted).

Figure 4:
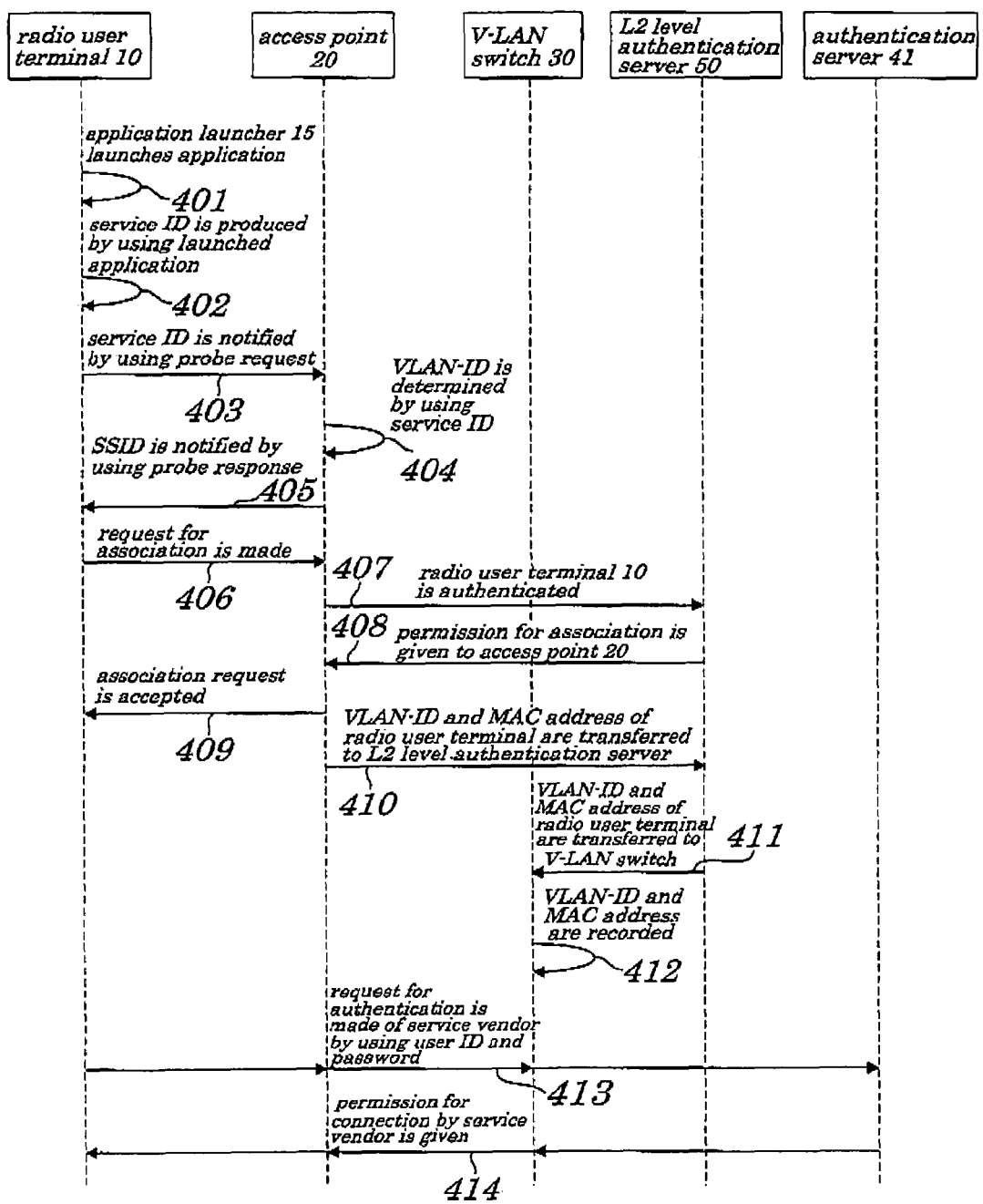
FIG. 4 is a sequence diagram showing operations of the network service connecting system according to the second embodiment of the present invention.

Next, operations of the network service connecting system of the second embodiment of the present invention are described in detail by referring to FIG. 4.

Operations to be performed in Step 401 to Step 404, that is, operations from launching of an application by the application launcher 15 to determination of a VLAN-ID by the access point 20 using a service ID received from the radio user terminal 10, are the same as those in Step 201 to Step 204 in the first embodiment and their descriptions are omitted accordingly.

In Step 205 in the first embodiment, the VLAN-ID transmitting section 25, immediately after having received a VLAN-ID from the SSID transmission judging section 24, transfers the VLAN-ID to the V-LAN switch 30. However, in the second embodiment, the VLAN-ID transmitting section 25 temporarily holds the VLAN-ID without transferring it to the V-LAN switch 30.

In Step 405, the access point 20 notifies the radio user terminal 10 of the SSID by using a Probe response. In Step 406, the radio user terminal 10 having received the SSID, by using the received SSID, makes a request of the access point 20 for establishing of association. In the second embodiment, the radio user terminal 10 transmits, in addition to contents described in the first embodiment, at time of the request for establishing the association, authentication information which is used when the L2 level authentication server 50 authenticates the radio user terminal 10, to the access point 20. The authentication information is held by the data storing section 16 in the radio user terminal 10. Moreover, the authentication information to be used here includes a user ID and a password used for connection to the service vendor 40, a random number produced from the user ID and password, or a like.

In Step 407, the access point 20 having accepted the association request from the radio user terminal 10 transfers the authentication information received from the radio user terminal 10 to the L2 level authentication server 50 and makes a request for an authentication process required for permission for association requested by the radio user terminal 10. The L2 level authentication server 50 having received the request for the authentication process from the access point 20 authenticates the radio user terminal 10 using the authentication information received from the access point 20. In Step 408, when the radio user terminal 10 is authenticated successfully, the L2 level authentication server 50 notifies the access point 20 of permission for association. In Step 409, the access point 20 having received notification of the permission for association accepts the association request from the radio user terminal 10.

After the association request from the radio user terminal 10 has been accepted, in Step 410, the VLAN-ID transmitting section 25 transfers a MAC address of the radio user terminal 10 that transmitted the association request and a VLAN-ID to the L2 level authentication server 50. In Step 411, the L2 level authentication server 50 having received the MAC address and VLAN-ID transmits them to the V-LAN switch 30. In Step 412, the V-LAN switch 30 records the received MAC address and VLAN-ID.

In Step 413 to 414, the radio user terminal 10 performs processing of connection to the service vendor 40 via the access point 20, however, these processes are the same as those in Step 210 to 211 in the first embodiment and their descriptions are omitted accordingly.

Moreover, by adding such functions as described below to the radio user terminal 10 in the network service connecting system of the present invention, the radio user terminal 10 can collect information about positions of Hot Spots in which service is usable and, when a user actually launches applications, a service area being nearest to a present position of the radio user terminal 10 can be used.

(1) While an application is not launched by the application launcher 15, the Active Scan processing is periodically performed by using a default service ID.

(2) A position detecting section to detect a position provided by a GPS (Global Positioning System) or other communication means such as a PHS (Personal Handyphone System), PDC (Personal Digital Cellular) or a like is incorporated in the radio user terminal 10.

(3) A position where a service ID and its SSID are acquired is to be stored in the data storing section 16 in the radio user terminal 10.

Also, the radio user terminal 10 and access point 20 may be realized not only by an exclusive hardware but also by storing a program that can realize their functions in a storage medium from which a computer can read and by having a computer system to serve as the radio user terminal 10 or the access point 20 read the program stored in the storage medium. The storage medium from which a computer can read includes such a storage medium as a floppy disk, magneto-optic disk, CD-ROM (Compact Disk Read-Only Memory) or a like, or such a storage device as a hard disk or a like being embedded in a computer system. Moreover, the storage medium from which a computer can read includes a medium (transmission medium or transmission wave) that dynamically holds the program for a short time as seen in a case where the program is transmitted through the Internet or a medium that holds the program for a specified time as seen in volatile memory in a computer system.

It is apparent that the present invention is not limited to the above embodiments but may be changed and modified without departing from the scope and spirit of the invention.

What is claimed is:

1. A network service connecting method by which an access point enables a wireless user terminal to be connected to a service vendor on a network via a wireless LAN (Local Area Network), said method comprising:

a first step in which said wireless user terminal produces a service ID (Identification) containing a service application ID being an ID of service required for execution of a specified application selected by said wireless user terminal and a service vendor ID being an ID of said service vendor holding authentication information which is required for said wireless user terminal to be connected to said service vendor;

a second step in which said wireless user terminal, by using said service ID, searches for an access point existing in an area where said wireless user terminal is communicable;

a third step in which an access point having received said service ID, by referring to a table storing data on associated relations among a service application ID, a service vendor ID of a service vendor providing service identified by said service application ID, and a VLAN (Virtual Local Area Network)-ID being an ID of a V-LAN switch serving as a mediator for connection between said service vendor and said access point, judges whether or not a service vendor ID corresponding to a service application ID included in said service ID is contained in said service ID;

a fourth step in which said access point, only when judging said service vendor ID corresponding to said service application ID to be contained in the service ID in said third step, selects a VLAN-ID corresponding to said service vendor ID; and a fifth step in which said access point, only when judging said service vendor ID corresponding to said service application ID to be contained in the service ID in said third step, transmits an SSID (Service Set Identification) set at said access point to said wireless user terminal.

2. The network service connecting method according to claim 1, wherein said service ID contains two or more service vendor IDs.

3. The network service connecting method according to claim 1, wherein said first step further comprises a step in which said wireless user terminal adds identification information to be used for distinguishing said service ID from said SSID (Service Set Identification) to said service ID.

4. The network service connecting method according to claim 1, wherein said first step further comprises a step in which said wireless user terminal adds detecting option information to indicate whether or not said service application ID contained in said service ID is indispensable to said application to said service ID for every said service application ID.

5. The network service connecting method according to claim 4, wherein, in said third step, said access point judges, by referring to said table, whether or not a service vendor ID, to be contained in said service ID, said service vendor ID corresponding to said service application ID to which a detecting option indicating that said service application ID is indispensable to said application has been added is contained in said service ID.

6. The network service connecting method according to claim 1, wherein, in said fourth step, said access point, when two or more VLAN-IDs are allowed to be selected, preferentially selects the VLAN-ID corresponding to more service application IDs.

7. The network service connecting method according to claim 1, wherein, in said fourth step, said access point, when two or more VLAN-IDs are allowed to be selected, selects the VLAN-ID according to priority specified by said access point.

8. The network service connecting method according to claim 1, further comprising a step in which, after said fifth step, said access point, when said wireless user terminal makes a request asking establishment of association with said access point by using said SSID, makes a request of said wireless user terminal for authentication information to connect said wireless user terminal to said service vendor, and then asks an authentication server, which shares authentication information for connecting to said service vendor, to perform authentication for said wireless user terminal and, only when the authentication is successfully performed, accepts said request for establishment of association from said wireless user terminal to establish the association.

9. A network service connecting computer program making a wireless user terminal enabled by an access point to be connected to a service vendor on a network via a wireless LAN perform a first step of producing a service ID containing a service application ID being an ID of service required for execution of a specified application selected by said wireless user terminal and a service vendor ID being an ID of said service vendor holding authentication information which is required for said wireless user terminal to be connected to said service vendor and perform a second step of searching, by using said service ID, for an access point existing in an area where said wireless user terminal is communicable, wherein said first step further comprises a step in which said wireless user terminal adds detecting option information indicating whether or not said service application ID contained in said service ID is indispensable to said application to said service ID for every said service application ID.

10. The network service connecting computer program according to claim 9, wherein said service ID contains two or more service vendor IDs.

11. The network service connecting computer program according to claim 9, wherein said first step further comprises a step in which said wireless user terminal adds identification information to be used for distinguishing sad service ID from an SSID (Service Set Identification) set at said access point to said service ID.

12. A network service connecting computer program making an access point which enables a wireless user terminal to be connected to a service vendor on a network via a wireless LAN perform a first step of judging, when receiving a service ID transmitted from said wireless user terminal, by referring to a table which stores data on associated relations among a service application ID, a service vendor ID of a service vendor providing service identified by said service application ID, and a VLAN-ID being an ID of a V-LAN switch serving as a mediator for connection between said service vendor and said access point, whether or not said service vendor ID associated with said service application ID contained in said service ID is contained in said service ID, performs a second step of selecting, only when judging said service vendor ID corresponding to said service application ID to be contained in the service ID in said first step, a VLAN-ID corresponding to said service vendor ID, and perform a third step of transmitting, only when judging said service vendor ID corresponding to said service application ID to be contained in the service ID in said first step, an SSID (Service Set Identification) set at said access point to said wireless user terminal, wherein, in said first step, by referring to said table, judgment is made as to whether or not said service vendor ID is contained in said service ID, said service vendor ID corresponding to said service application ID to which a detecting option indicating that said service application ID is indispensable to said application has been added is contained in said service ID.

13. The network service connecting computer program according to claim 12, wherein, in said second step, when two or more VLAN-IDs are allowed to be selected, the VLAN-ID corresponding to more service application IDs is selected preferentially.

14. The network service connecting computer program according to claim 12, wherein, in said second step, when two or more VLAN-IDs are allowed to be selected, the VLAN-ID is selected according to priority specified by said access point.

15. The network service connecting computer program according to claim 12, further making said access point perform a step in which, after said third step, when said wireless user terminal makes a request asking establishment of association with said access point by using said SSID, a request is made of said wireless user terminal for authentication information to connect said wireless user terminal to said service vendor, and then a request is made asking an authentication server, which shares authentication information for connecting to said service vendor, to perform authentication for said wireless user terminal and, only when the authentication is successfully performed, said request for establishment of association from said wireless user terminal is accepted to establish the association.

16. A wireless user terminal enabled by an access point to be connected to a service vendor on a network via a wireless LAN comprising:
a first unit to produce a service ID containing a service application ID being an ID of service required for execution of a specified application selected by said wireless user terminal and a service vendor ID being an ID of said service vendor holding authentication information which is required for said wireless user terminal to be connected to said service vendor; and
a second unit to search, by using said service ID, for an access point existing in an area where said wireless user terminal is communicable,
wherein said first unit further comprises a unit to add detecting option information indicating whether or not said service application ID contained in said service ID is indispensable to said application to said service ID for every said service application ID.

17. The wireless user terminal according to claim 16, wherein said service ID contains two or more service vendor IDs.

18. The wireless user terminal according to claim 16, wherein said first unit further comprises a unit to add identification information to identify an SSID (Service Set Identification) set at said access point to said service ID.

19. An access point structure which enables a wireless user terminal to be connected to a service vendor on a network via a wireless LAN comprising:
a first unit to store a table which saves data on associated relations among a service application ID, a service vendor ID of a service vendor providing service identified by said service application ID, and a VLAN-ID being an ID of a V-LAN switch serving as a mediator for connection between said service vendor and an access point;
a second unit to judge, when receiving a service ID transmitted by said wireless user terminal, by referring to said table, whether or not a service vendor ID associated with said service application ID contained in said service ID is contained in said service ID;
a third unit to select, when said second unit judges said service vendor ID corresponding to said service application ID to be contained in said service ID, a VLAN-ID corresponding to said service vendor ID; and
a fourth unit to transmit, when said second unit judges said service vendor ID corresponding to said service application ID to be contained in said service ID, an SSID (Service Set Identification) of said access point to said wireless user terminal,
wherein said second unit, by referring to said table, judges whether or not said service vendor ID is contained in said service ID, said service vendor ID corresponding to said service application ID to which an detecting option indicating that said service application ID is indispensable to said application has been added is contained in said service ID.

20. The access point structure according to claim 19, wherein said third unit, when two or more VLAN-IDs are allowed to be selected, preferentially selects the VLAN-ID corresponding to more service application IDs.

21. The access point structure according to claim 19, wherein said third unit, when two or more VLAN-IDs are allowed to be selected, selects the VLAN-ID according to priority specified by said access point.

22. The access point structure according to claim 19, further comprising a unit to make, after said SSID has been transmitted by said fourth unit, when a request is made asking establishment of association by using said SSID, a request of said wireless user terminal for authentication information to connect said wireless user terminal to said service vendor, and then to ask an authentication server, which shares authentication information for connecting to said wireless user terminal, to perform authentication for said wireless user terminal and, only when the authentication is successfully performed, to accept said request for establishment of association from said wireless user terminal to establish the association.

23. A network service connecting system in which an access point enables a wireless user terminal to be connected to a service vendor on a network via a wireless LAN,
wherein said access point structure which enables a wireless user terminal to be connected to a service vendor on a network via a wireless LAN comprises:
a first unit to store a table which saves data on associated relations among a service application ID, a service vendor ID of a service vendor providing service identified by said service application ID, and a VLAN-ID being an ID of a V-LAN switch serving as a mediator for connection between said service vendor and an access point;
a second unit to judge, when receiving a service ID transmitted by said wireless user terminal, by referring to said table, whether or not a service vendor ID associated with said service application ID contained in said service ID is contained in said service ID;
a third unit to select, when said second unit judges said service vendor ID corresponding to said service application ID to be contained in said service ID, a VLAN-ID corresponding to said service vendor ID; and
a fourth unit to transmit, when said second unit judges said service vendor ID corresponding to said service application ID to be contained in said service ID, an SSID (Service Set Identification) of said access point to said wireless user terminal; and
wherein said wireless user terminal enabled by an access point to be connected to a service vendor on a network via a wireless LAN comprises:
a first unit to produce a service ID containing a service application ID being an ID of service required for execution of a specified application selected by said wireless user terminal and a service vendor ID being an ID of said service vendor holding authentication information which is required for said wireless user terminal to be connected to said service vendor; and
a second unit to search, by using said service ID, for an access point existing in an area where said wireless user terminal is communicable.

* * * * *